United States Patent
Peng

(10) Patent No.: US 11,380,354 B2
(45) Date of Patent: Jul. 5, 2022

(54) HEAT-ASSISTED MAGNETIC RECORDING HEAD HAVING NEAR-FIELD TRANSDUCER WITH SUNKEN PLASMONIC PLATE

(71) Applicant: Seagate Technology LLC, Freemont, CA (US)

(72) Inventor: Chubing Peng, Bloomington, MN (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

(21) Appl. No.: 17/238,079

(22) Filed: Apr. 22, 2021

(65) Prior Publication Data

US 2021/0335386 A1    Oct. 28, 2021

Related U.S. Application Data

(60) Provisional application No. 63/013,995, filed on Apr. 22, 2020.

(51) Int. Cl.
   *G11B 5/48*    (2006.01)
   *G11B 5/31*    (2006.01)
   *G11B 5/00*    (2006.01)

(52) U.S. Cl.
   CPC ...... *G11B 5/314* (2013.01); *G11B 2005/0021* (2013.01)

(58) Field of Classification Search
   None
   See application file for complete search history.

(56) References Cited

U.S. PATENT DOCUMENTS

| | | | | |
|---|---|---|---|---|
| 9,799,352 B1* | 10/2017 | Chen | | G11B 5/314 |
| 9,852,752 B1* | 12/2017 | Chou | | G11B 5/6082 |
| 10,586,560 B1* | 3/2020 | Wang | | G11B 5/314 |
| 10,811,035 B1* | 10/2020 | Lee | | G11B 5/6088 |
| 2010/0123967 A1* | 5/2010 | Batra | | G11B 5/3116 360/59 |
| 2011/0205863 A1* | 8/2011 | Zhao | | B82Y 10/00 369/13.33 |
| 2012/0045662 A1* | 2/2012 | Zou | | G11B 5/3133 428/810 |
| 2013/0148485 A1* | 6/2013 | Jin | | G11B 5/314 369/13.17 |
| 2016/0275979 A1* | 9/2016 | Sahoo | | G11B 5/314 |
| 2016/0351221 A1* | 12/2016 | Blaber | | G11B 5/314 |
| 2017/0249958 A1* | 8/2017 | Blaber | | G11B 5/187 |

* cited by examiner

*Primary Examiner* — Peter Vincent Agustin

(57) ABSTRACT

A recording head includes a nanorod configured to heat a hotspot on a recording media, a plasmonic plate configured to concentrate an electric field to excite the nanorod, and a heat sink configured to dissipate heat from the nanorod. The recording head includes a first diffusion barrier plate configured to resist diffusion of materials between the plasmonic plate and the nanorod and a second diffusion barrier plate configured to resist diffusion of materials between the heat sink and the nanorod. The first diffusion barrier plate is disposed between the nanorod and the plasmonic plate and is coupled to a bottom surface of the nanorod. The second diffusion barrier plate is disposed between the heat sink and the nanorod and is coupled to the top surface of the nanorod.

19 Claims, 9 Drawing Sheets

HEAT-ASSISTED MAGNETIC RECORDING HEAD HAVING NEAR-FIELD TRANSDUCER WITH SUNKEN PLASMONIC PLATE

This application claims the benefit of U.S. Provisional Patent Application No. 63/013,995, filed Apr. 22, 2020, the entire content of which is hereby incorporated by reference.

TECHNICAL FIELD

The disclosure relates to magnetic recording devices.

BACKGROUND

Heat-assisted magnetic recording (HAMR) devices utilize light to increase storage density of a magnetic recording media. A HAMR device includes a waveguide that delivers light from a light source to a near-field transducer (NFT), which excites the NFT. The NFT concentrates energy from the light source into a tiny spot in a recording layer of a magnetic recording media. Concentrating energy on the recording layer raises the media temperature locally, reducing the writing magnetic field required for high-density recording. However, exciting the NFT increases the temperature of the NFT. Increasing the temperature of the NFT too much may degrade the performance NFT and may ultimately lead to failure of the NFT.

SUMMARY

The disclosure describes a heat-assisted magnetic recording head that includes a near-field transducer (NFT). The NFT includes a nanorod disposed between a plasmonic plate and a heat sink. Placing the nanorod between the plasmonic plate and the heat sink may enable heat to flow away from the nanorod more effectively than other NFTs and may enable the nanorod to increase the thermal gradient of the hot spot generated by the NFT. Enabling heat to flow away from the nanorod more effectively may increase the longevity and/or reliability of the NFT. In some examples, increasing the thermal gradient of the hot spot may reduce the area of a recording media that is heated by the NFT, which may enable the HAMR recording head to store bits of data closer to one another, thereby potentially increasing the areal density of the recording media.

In one example, a recording head includes a nanorod configured to heat a hotspot on a recording media, and a plasmonic plate configured to concentrate an electric field to the nanorod, upon excitation by an electromagnetic wave, or light. The recording head also includes a first diffusion barrier plate configured to resist diffusion of materials between the plasmonic plate and the nanorod, where the first diffusion barrier plate is disposed between the nanorod and the plasmonic plate and is coupled to a bottom surface of the nanorod. The recording head further includes a heat sink configured to dissipate heat from the nanorod and a second diffusion barrier plate configured to resist diffusion of materials between the heat sink and the nanorod, where the second diffusion barrier plate is disposed between the heat sink and the nanorod and is coupled to the top surface of the nanorod.

In another example, a data storage device includes a recording head. The recording head includes a nanorod configured to heat a hotspot on a recording media and a plasmonic plate configured to concentrate an electric field to the nanorod upon excitation by an electromagnetic wave, or light. The recording head also includes a first diffusion barrier plate configured to resist diffusion of materials between the plasmonic plate and the nanorod, where the first diffusion barrier plate is disposed between the nanorod and the plasmonic plate and is coupled to a bottom surface of the nanorod. The recording head further includes a heat sink configured to dissipate heat from the nanorod and a second diffusion barrier plate configured to resist diffusion of materials between the heat sink and the nanorod, where the second diffusion barrier plate is disposed between the heat sink and the nanorod and is coupled to the top surface of the nanorod.

These and other features and aspects of various examples may be understood in view of the following detailed discussion and accompanying drawings.

DETAILED DESCRIPTION

Figure 1:
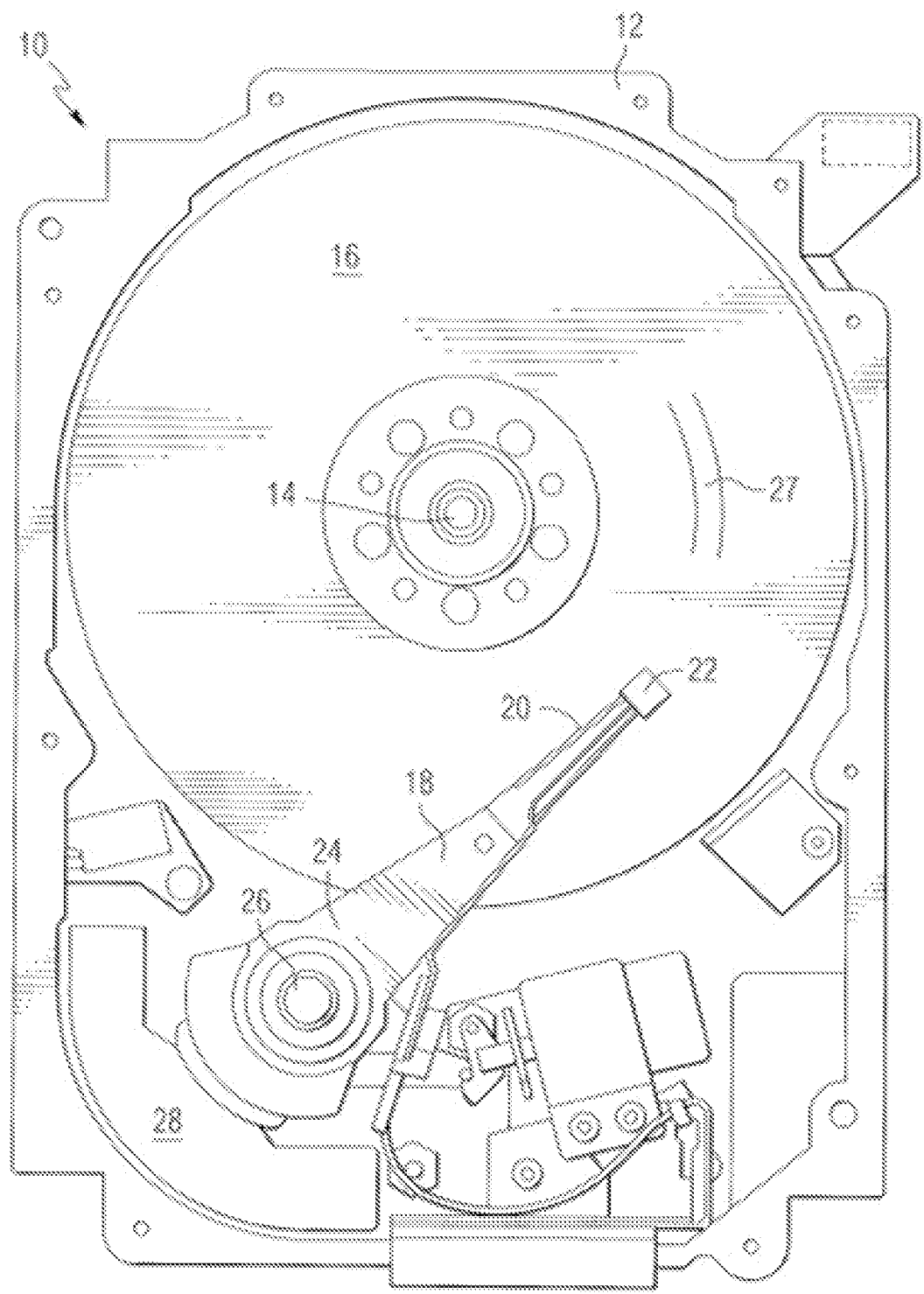
FIG. 1 is a pictorial representation of a data storage device, in accordance with an aspect of this disclosure.

FIG. 1 is a pictorial representation of a data storage device in the form of a disc drive 10, in accordance with various aspects of the disclosure. Disc drive 10 may be, in some examples, a magnetic data storage device, e.g., a heat-assisted magnetic recording (HAMR) hard disk drive. In the example of FIG. 1, disc drive 10 includes a housing 12 (with the upper portion removed and the lower portion visible in this view) sized and configured to contain the various components of disc drive 10. Disc drive 10 includes a spindle motor 14 configured to rotate at least one magnetic storage media 16 within the housing. Disc drive 10 includes at least one arm 18 contained within the housing 12. Each arm 18 includes a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art.

Figure 2:
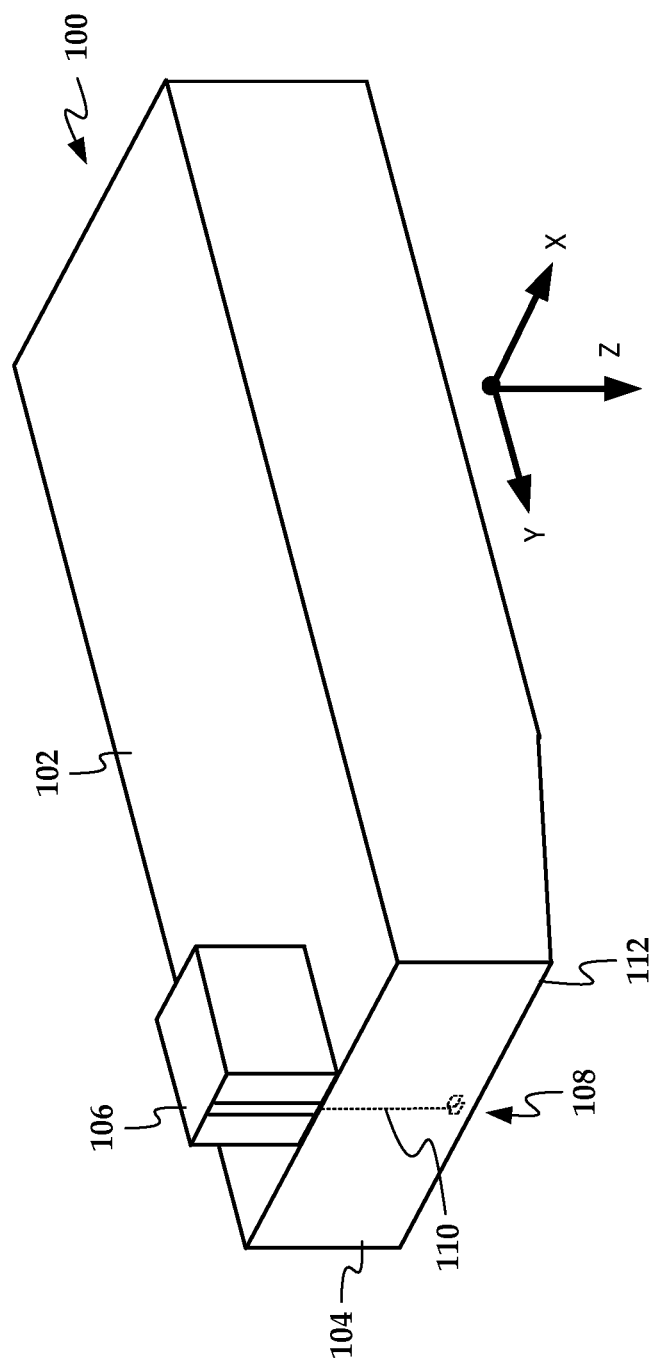
FIG. 2 is a perspective view of a slider assembly, in accordance with one or more aspects of the present disclosure.

FIG. 2 is a perspective view of a slider assembly, in accordance with one or more aspects of the present disclosure. Slider 100 is an example of slider 22 of FIG. 1. Slider 100 may also be referred to herein interchangeably as a head, write head, read head, read/write head, recording head, etc. Slider 100 includes a slider body 102 with transducers 108 at a trailing edge 104 that are held proximate to a surface of a magnetic recording medium (not shown in FIG. 2), e.g., a magnetic disk. Examples of transducers 108 include a read head (also referred to as a read transducer), a write head (also referred to as a write transducer), and a near-field transducer (NFT).

Slider 100 includes an energy source 106 and a waveguide 110. Examples of energy source 106 include a laser diode, such as a transverse magnetic (TM) polarized laser or a transverse electric (TE) polarized laser. Waveguide 110 delivers electromagnetic energy from energy source 106 to a near-field transducer (NFT) of transducers 108. The NFT achieves surface plasmon resonance and directs the energy out of a media-facing surface 112 to create a small hotspot in the recording medium. Increasing the temperature of the recording medium reduces the coercivity of the recording medium and enables a write head of transducers 108 to write data to the recording medium.

Figure 3A:
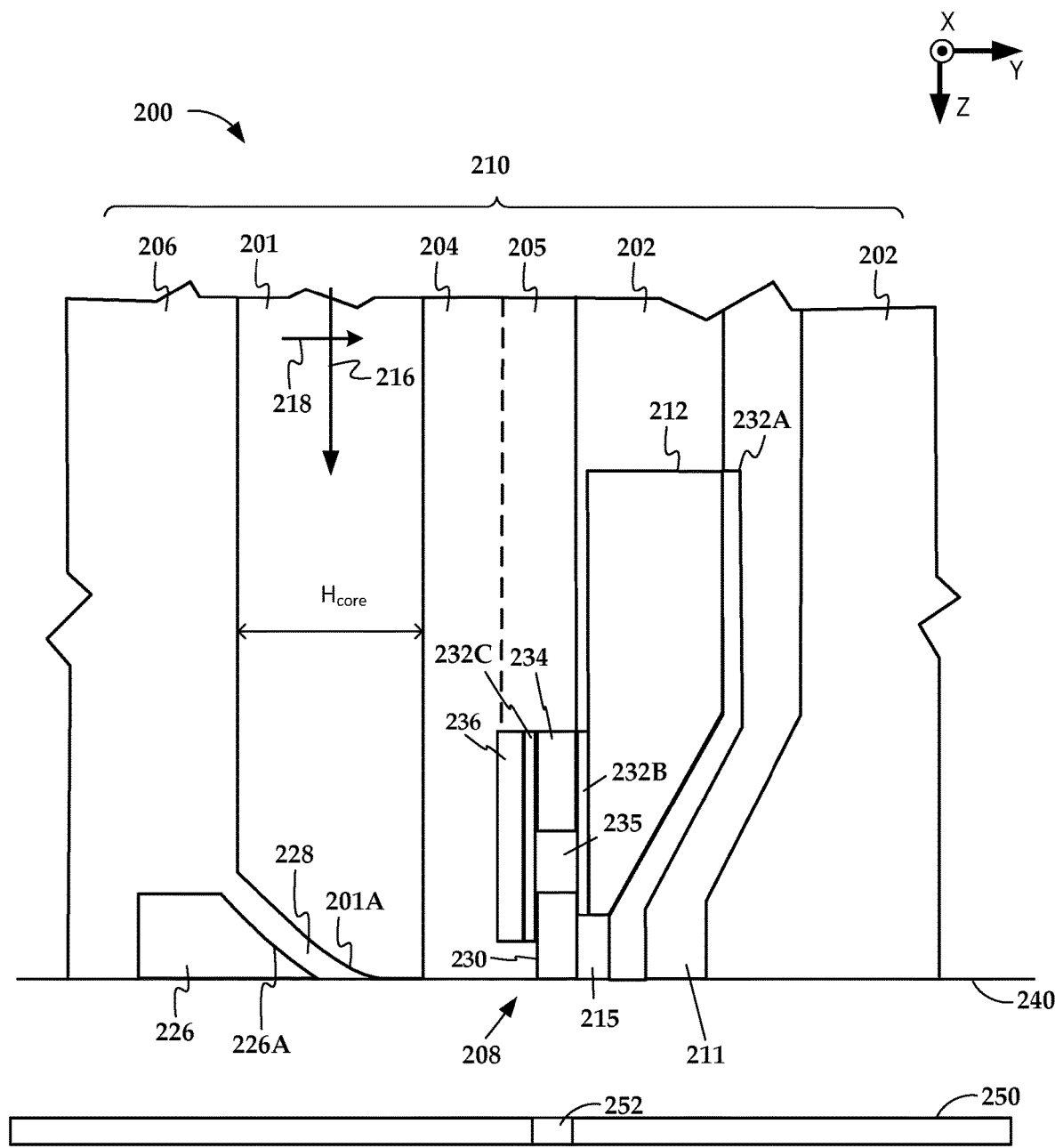
FIG. 3A is a cross-sectional view of a slider along a down-track plane, in accordance with one or more aspects of the present disclosure.

FIG. 3 is a cross-sectional view of a slider along a down-track plane, in accordance with one or more aspects of the present disclosure. Slider 200 may be an example of slider 100 of FIG. 2. Slider 200 includes an NFT 208 and waveguide 210. NFT 208 and waveguide 210 may be examples of transducer 108 and waveguide 110 of FIG. 2, respectively. Waveguide 210 delivers light 216 (e.g., from energy source 106 of FIG. 2) to NFT 208 at a media-facing surface 240 (also referred to as an air-bearing surface (ABS)) of slider 200. In one example, waveguide 210 is a three-dimensional dielectric waveguide that delivers light 216 with a fundamental transverse magnetic mode ($TM_{00}$). In the example of FIG. 3A, the electric field is indicated by arrow 218. The wavelength λ of light 216 may be, in some examples, approximately 808 nm.

In some examples, waveguide 210 includes a core 201, top cladding layer 202, middle cladding layers 204, 205, and bottom cladding layer 206. NFT 208 is disposed within one of middle cladding layers 204 or 205. In one example, middle cladding layer 204 separates core 201 and nanorod 230 of NFT 208. That is, middle cladding layer 204 may be disposed between core 201 and nanorod 230.

Figure 4:
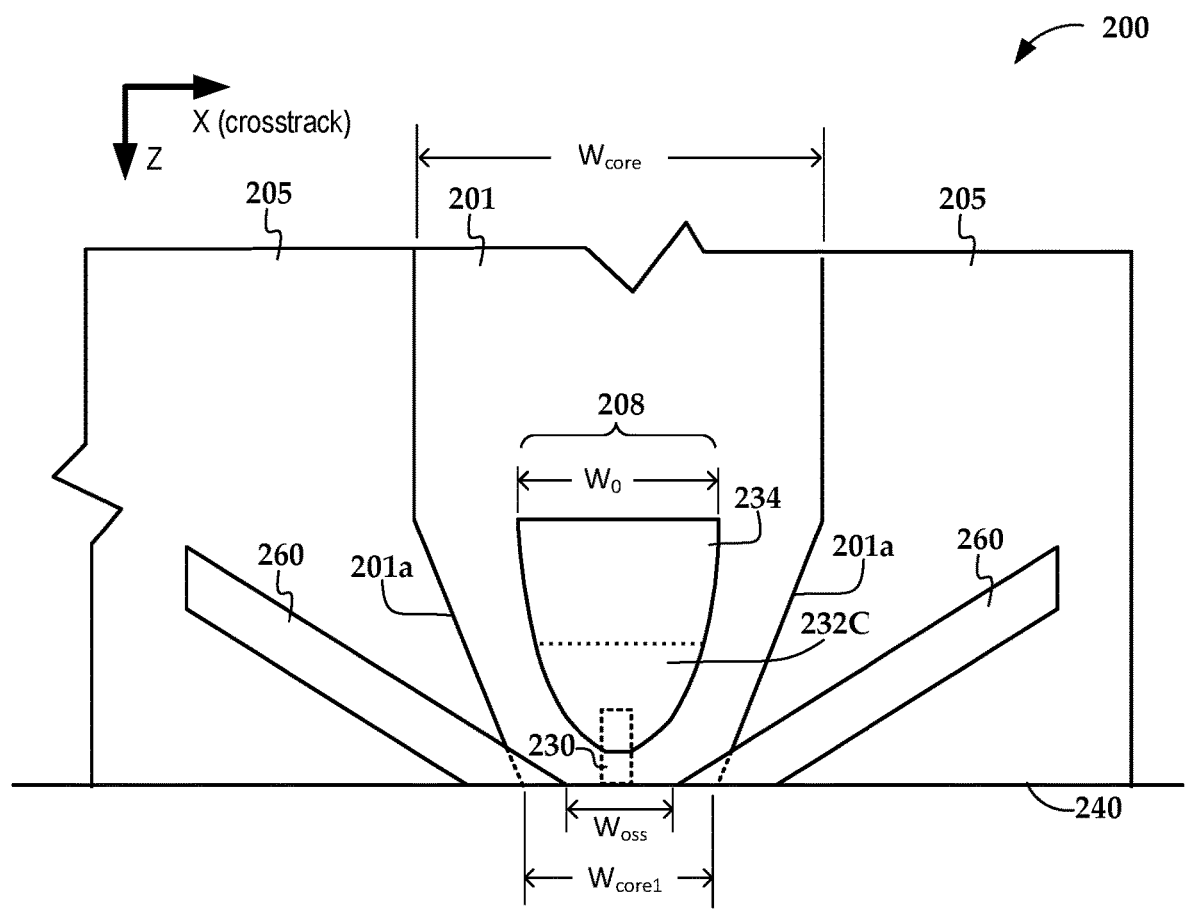
FIG. 4 is a wafer plane view of the slider of FIG. 3A, in accordance with one or more aspects of the present disclosure.

Core 201, top cladding layer 202, middle cladding layers 204, 205, and bottom cladding layer 205 may each include a dielectric material. Examples of dielectric materials include aluminum oxide ($Al_2O_3$), silicon dioxide ($SiO_2$), tantalum pentoxide ($Ta_2O_5$), titanium dioxide ($TiO_2$), niobium pentoxide ($Nb_2O_5$), or other dielectric compound (e.g., SiOxNy). In one example, core 201 includes $Ta_2O_5$. In one example, bottom cladding 206, top cladding 202 and dielectric spacer 215 include $Al_2O_3$. Middle cladding layers 204, 205 include, in some examples, $SiO_2$ and/or $Al_2O_3$. In some examples, the refractive index of core 201 is higher than the refractive indices of bottom cladding layer 206 and middle cladding layer 204, which may facilitate efficient propagation of light 216 through waveguide 210. According to some examples, core 201 is approximately 600 nm wide (e.g., along cross-track direction, $W_{core}$ as shown in FIG. 4) and 400 nm thick (e.g., along down-track direction, $H_{core}$).

NFT 208 includes, in some examples, nanorod (also referred to as a peg) 230, diffusion barrier plates 232A-232C (collectively, diffusion barrier plates 232), heat sink 234, and plasmonic plate 236 (also referred to as a sunken plasmonic plate or a sunken plasmonic resonator). Nanorod 230 may be configured to generate a hotspot 252 of the recording medium 250. In one example, nanorod 230 includes a low-loss plasmonic material, such as Au, Au-alloy, Ag, or Cu.

Diffusion barrier plates 232 are configured to resist diffusion of material between two layers. For example, diffusion barrier plate 232A is configured to resist diffusion of material between write pole 211 and heat sink 212. Similarly, diffusion barrier plate 232B is configured to resist diffusion of materials between heat sink 212 and nanorod 230, while diffusion barrier plate 232C is configured to resist diffusion of materials between plasmonic plate 236 and nanorod 230. In some examples, diffusion barrier plates 232 include a plasmonic material. Examples of plasmonic materials include Rh, Ir, Pt, Pd, metal nitrides (e.g., TiN, ZrN), graphene, among others. In the example of FIG. 3A, diffusion barrier plates 232 are thinner than plasmonic plate 236. In some examples, one or more of diffusion barrier plates 232 are thicker than plasmonic plate 236. Diffusion barrier plates 232 may be approximately the same thickness. In some scenarios, at least one of diffusion barrier plates 232 is a different thickness that one of the other diffusion barrier plates 232.

Plasmonic plate 236 is configured to concentrate electric field 218 to excite nanorod 230. That is, plasmonic plate 236 may excite nanorod 230 by concentrating electric field 218. In one example, plasmonic plate 236 includes a low-loss plasmonic material, such as Au, Au-alloy, Ag, Cu.

Heat sinks 234 and 212 are configured to dissipate heat. In some examples, heat sinks 234 and 212 include a metal, such as Au or a Au-alloy.

As illustrated in the example of FIG. 3A, diffusion barrier plate 232C separates plasmonic plate 236 and nanorod 230. That is, diffusion barrier plate 232C may be disposed between plasmonic plate 236 and nanorod 230. In one example, diffusion barrier plate 232B separates (e.g., is disposed between) nanorod 230 and heat sink 212. For example, diffusion barrier plate 232B may be coupled to (e.g., directly coupled to) heat sink 212 and nanorod 230. In this way, nanorod 230 may be disposed between diffusion barrier plates 232B and 232C, and diffusion barrier plates 232B and 232C separate nanorod 230 from heat sink 212 and plasmonic plate 236, respectively.

In some examples, diffusion barrier plate 232C separates (e.g., is disposed between) plasmonic plate 236 and heat sink 234. In one example, diffusion barrier plate 232B separates (e.g., is disposed between) heat sink 212 and heat sink 234. That is, heat sink 234 may be disposed between diffusion barrier plates 232B and 232C, and diffusion barrier plates 232B and 232C separate heat sink 234 from heat sink 212 and plasmonic plate 236, respectively.

In the example of FIG. 3A, heat sink 212 is disposed between diffusion barrier plates 232B and 232A. In some scenarios, diffusion barrier plate 232A separates (e.g., is disposed between) heat sink 212 and write pole 211.

Arranging nanorod 230, diffusion barrier plates 232, heat sink 234, plasmonic plate 236 and heat sink 212 as illustrated in FIG. 3A may improve the thermal performance of NFT 208. In some instances, positioning nanorod 230 between heat sink 212 and plasmonic plate 236 may increase the amount of heat removed from nanorod 230. For instance, heat may flow from nanorod 230 along two paths to increase the amount of heat removed from nanorod 230. As one example, heat may flow out one side of nanorod 230 to heat sink 212 and out another side of nanorod 230 to plasmonic plate 236 to heat sink 234 and ultimately to heat sink 212. In this way, the temperature of nanorod 230 may increase less than other NFT designs during write operations, which may increase the reliability and/or longevity of NFT 208.

Dielectric spacers 215 and 235 include a dielectric material. In the example of FIG. 3A, dielectric spacer 235 separates diffusion barrier plates 232B and 232C in the y-direction and separates heat sink 234 and nanorod 230 in the z-direction. That is, dielectric spacer 235 is disposed between diffusion barrier plates 232B and 232C in the y-direction and is disposed between heat sink 234 and nanorod 230 in the z-direction. As also shown in the example of FIG. 3A, dielectric spacer 215 separates nanorod 230 and diffusion barrier plate 232A. The downtrack length of the dielectric spacer 215 between diffusion barrier plate 232A and nanorod 230 may be, in some scenarios, approximately 6 nm-approximately 15 nm, to shape the temperature profile of the hot spot 252 in the media along the down-track direction for high thermal gradient.

Waveguide 210 may include, in some instances, funnel coupler 226 and dielectric spacer 228. In one example, funnel coupler 226 includes a reflective surface 226A. As shown in FIG. 3A, reflective surface 226A faces down track-slanted surface 201A of core 201 and is separated from down track-slanted surface 201A of core 201 by dielectric spacer 228. Funnel coupler 226 may be made of a metallic material, such as a low-loss plasmonic material (e.g., Au), a high-loss plasmonic material (e.g., Rh, Ir, or Pt), and a high-loss refractory metal (e.g., Ru). In some examples, dielectric spacer 228 may include a dielectric material (e.g., $SiO_2$ and $Al_2O_3$) having an index of refraction lower than the material of core 201, which may reduce the light absorbed by funnel coupler 226. In some examples, funnel coupler 226 may further squeeze light 216 to nanorod 230 (e.g., due to the nature of metal of funnel coupler 226 and the $TM_{00}$ mode used for NFT excitation).

Slider 200 includes write pole 211 and heat sink 212. Write pole 211 (also referred to herein as a "magnetic pole") is located near NFT 208. Heat sink 212 thermally couples NFT 208 to write pole 211. Media-facing surface 240 of slider 200 may be coated with an approximately 1 nm thick $Ta_2O_5$ layer and an approximately 1.5 nm thick a diamond-like-carbon layer.

Recording medium 250 may include an approximately 3 nm thick carbon-overcoat layer, an approximately 12 nm thick FePt recording layer, an approximately 10 nm thick interlayer, a heat sink layer, and a soft magnetic layer on a glass substrate. In some scenarios, the air gap between media-facing surface 240 and recording medium 250 may be approximately 3 nm (e.g., during read operations and/or write operations).

In operation, during write operations, a magnetic coil (not shown) induces a magnetic field through write pole 211 in response to an applied current. Energy is condensed to the tip of the nanorod 230 through excitation of plasmonic plate 236 and diffusion barrier plate 232C in a form of surface-plasmon polaritons (SPPs) as well as the nanorod 230 by reaching longitudinal plasmonic resonance. At least a portion of the condensed electric field gets absorbed by recording medium 250 to generate hotspot 252. Heating recording medium 250 reduces the coercivity of a recording layer of recording medium 250 at hotspot 252. Write pole 211 sets a magnetic orientation in hotspot 252 of the recording medium, thereby writing data to the recording medium.

In this way, techniques of this disclosure may enable NFT 208 to generate a hotspot 252 of recording media 250. In contrast to examples where plasmonic plate 236 is disposed above nanorod 230 (e.g., between nanorod 230 and heat sink 212), positioning plasmonic plate 236 underneath nanorod 230, such that nanorod 230 is disposed between plasmonic plate 236 and heat sink 212, allows additional heat sinking of nanorod 230, which may increase the thermal gradient of hot spot 252 while reducing the temperature increase at the tip of nanorod 230. Increasing the thermal gradient of the hot spot 252 along the down-track direction near the write pole 211 enables slider 200 to write sharp magnetic transitions in recording media 250, thereby potentially increasing the linear density and therefore, the areal density in recording media 250. Coupling nanorod 230 to heat sink 212 and plasmonic plate 236, and coupling plasmonic plate 236 to heat sink 234 and thus to heat sink 212 may dissipate heat more efficiently than other examples. Dissipating heat more efficiently, and thereby reducing the increase in temperature of nanorod 230 when exciting nanorod 230, may increase the reliability and/or longevity of slider 200.

Figure 3B:
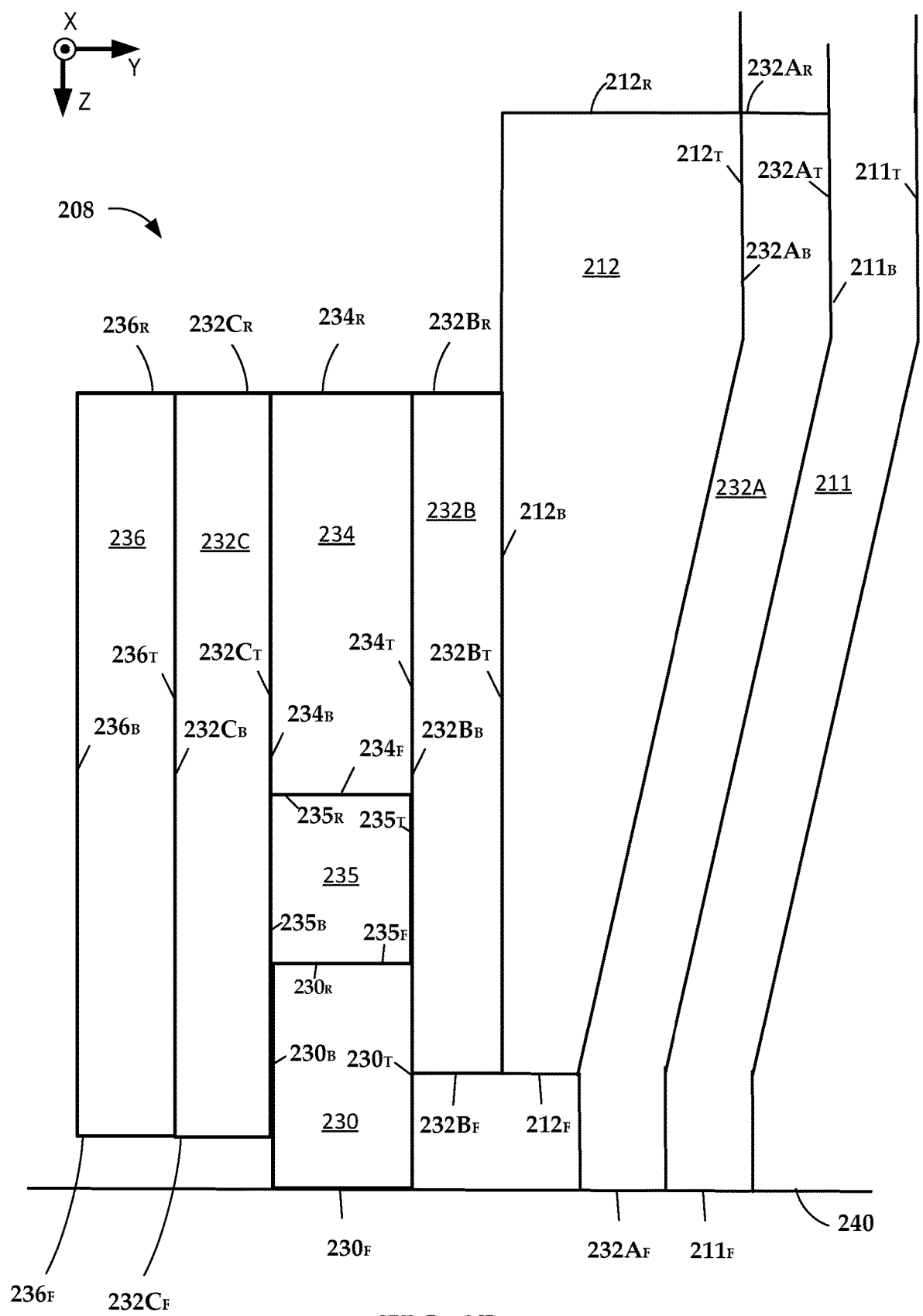
FIG. 3B is a cross-sectional view of the NFT of FIG. 3A, in accordance with one or more aspects of the present disclosure.

FIG. 3B is a cross-sectional view of NFT 208 of FIG. 3A, in accordance with one or more aspects of the present disclosure. As illustrated in FIG. 3B, write pole 211, heat sink 212, nanorod 230, diffusion barrier plate 232A, diffusion barrier plate 232B, diffusion barrier plate 232C, heat sink 234, dielectric spacer 235, and plasmonic plate 236 include media-facing surfaces $211_F$, $212_F$, $230_F$, $232A_F$, $232B_F$, $232C_F$, $234_F$, $235_F$, and $236_F$, respectively. In some examples, media-facing surfaces $236_F$ and $232C_F$ are approximately planar. Surfaces may be approximately planar when the distance between each surface and a reference plane (e.g., media-facing surface 240) are approximately equal (e.g., 0.1 nm). For example, a distance $R_{PP}$ between media-facing surface $236_F$ of plasmonic plate 236 and media-facing surface 240 of slider 200 may be approximately equal (e.g., within 0.1 nm) to a distance $R_{DB-C}$ between media-facing surface $232C_F$ of diffusion barrier plate 232C and media-facing surface 240 of slider 200. According to some scenarios, media-facing surfaces $232B_F$ and $212_F$ are approximately planar. For instance, the distance between each of media-facing surfaces $232B_F$ and $212_F$ and media-facing surface 240 of slider 200 is approximately equal (e.g., within 0.1 nm).

In the example of FIG. 3B, heat sink 212, nanorod 230, diffusion barrier plate 232A, diffusion barrier plate 232B, diffusion barrier plate 232C, heat sink 234, dielectric spacer 235, and plasmonic plate 236 include rear-facing surfaces $212_R$, $230_R$, $232A_R$, $232B_R$, $232C_R$, $234_R$, $235_R$, and $236_R$, respectively that are opposite the respective media-facing surfaces. In some examples, two or more of rear surfaces $236_R$, $232C_R$, $234_R$, and $232B_R$ are approximately planar. In the example of FIG. 3B, the distance between each of rear surfaces $236_R$, $232C_R$, $234_R$, and $232B_R$ and media-facing surface 240 of slider 200 is approximately equal (e.g., within 0.1 nm). In some examples, rear surfaces $212_R$ of heat sink 212 and $232A_R$ of diffusion barrier plate 232A are approximately planar. For example, the distance between each of rear surfaces $212_R$ and $232A_R$ and media-facing surface 240 of slider 200 is approximately equal (e.g., within 0.1 nm).

Write pole 211, heat sink 212, nanorod 230, diffusion barrier plate 232A, diffusion barrier plate 232B, diffusion barrier plate 232C, heat sink 234, dielectric spacer 235, and plasmonic plate 236 include bottom surfaces $211_B$, $212_B$, $230_B$, $232A_B$, $232B_B$, $232C_B$, $234_B$, $235_B$, and $236_B$, respectively. As further illustrated in the example of FIG. 3B, write pole 211, heat sink 212, nanorod 230, diffusion barrier plate 232A, diffusion barrier plate 232B, diffusion barrier plate 232C, heat sink 234, dielectric spacer 235, and plasmonic plate 236 include top surfaces $211_T$, $212_T$, $230_T$, $232A_T$, $232B_T$, $232C_T$, $234_T$, $235_T$, and $236_T$, respectively that are opposite the bottom surfaces.

In the example of FIG. 3B, top surface $236_T$ of plasmonic plate 236 is coupled to (e.g., directly coupled to) bottom surface $232C_B$ of diffusion barrier plate 232C. In some examples, diffusion barrier plate 232C is coupled (e.g., directly coupled) to nanorod 230, dielectric spacer 235, and heat sink 234. For example, as illustrated in FIG. 3B, top surface $232C_T$ of diffusion barrier plate 232C is coupled to the bottom surface $230_B$ of nanorod 230, bottom surface $234_B$ of heat sink 234, and bottom surface $235_B$ of dielectric spacer 235.

In some examples, diffusion barrier plate 232B is coupled (e.g., directly coupled) to nanorod 230, dielectric spacer 235, and heat sink 234. For example, as illustrated in FIG. 3B, bottom surface $232C_B$ of diffusion barrier plate 232B is coupled to the top surface $230_T$ of nanorod 230, top surface $234_T$ of heat sink 234, and top surface $235_T$ of dielectric spacer 235.

In the example of FIG. 3B, heat sink 212 is coupled (e.g., directly coupled) to diffusion barrier plate 232B and diffusion barrier plate 232A. In one example, bottom surface $212_B$ of heat sink 212 is coupled to top surface $232B_T$ of diffusion barrier plate 232B. In another example, top surface $212_T$ of heat sink 212 is coupled to bottom surface $232A_B$ of diffusion barrier plate 232A.

Diffusion barrier plate 232A may be coupled (e.g., directly coupled) to write pole 211. In one example, top surface $232A_T$ of diffusion barrier plate 232A is coupled to bottom surface $211_B$ of write pole 211. In one example, top surface 211T of write pole 211 is coupled to top cladding layer 202.

Figure 3C:
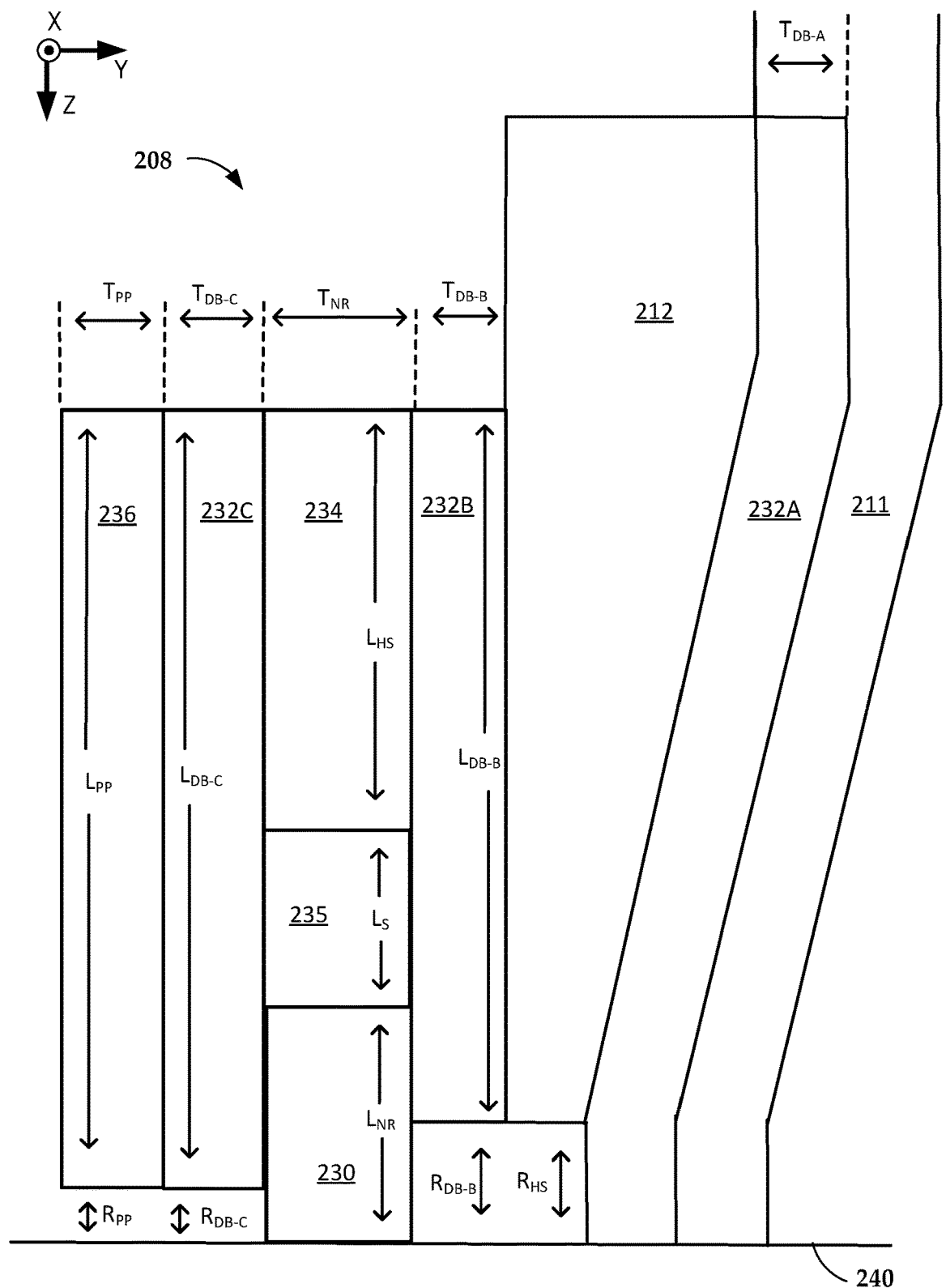
FIG. 3C is a cross-sectional view of the NFT of FIG. 3A, in accordance with one or more aspects of the present disclosure.

FIG. 3C is a cross-sectional view of NFT 208 of FIG. 3A, in accordance with one or more aspects of the present disclosure. As illustrated in FIG. 3C, media-facing surface 236F of plasmonic plate 236 is recessed a distance $R_{PP}$ (e.g., between approximately 10 nm and approximately 40 nm) from media-facing surface 240 of slider 200. Similarly, media-facing surface $232C_F$ of diffusion barrier plate 232C may be recessed a distance $R_{DB-C}$ (e.g., approximately 0 nm and approximately 40 nm) from media facing surface 240 of slider 200. In some instances, distance $R_{PP}$ is approximately equal to distance $R_{DB-C}$.

Media facing surface $232B_F$ of diffusion barrier plate 232B is recessed a distance $R_{DB-B}$ from media facing surface 240 of slider, which may be greater than $R_{pp}$ and smaller than $L_{NR}$, e.g., between approximately 30 nm and approximately 80 nm. In the example of FIG. 3C, media-facing surface 212F of heat sink 212 is recessed a distance $R_{HS}$, which may be approximately equal to distance $R_{DB-B}$. In some examples, recessed distances $R_{DB-C}$ and $R_{PP}$ are less than distances $R_{DB-B}$ and $R_{HS}$. That is, in some examples, plasmonic plate 236 and/or diffusion barrier plate 232C are recessed less than diffusion barrier plate 232B and/or heat sink 212. In such examples, locating plasmonic plate 236 and diffusion barrier plate 232C relatively close to media-facing surface 240 (compared to diffusion barrier plate 232B) may increase the excitation efficiency of the nanorod 230 and increase the heat dissipation from nanorod 230, which may enable a higher thermal gradient of the hot spot 252. Locating diffusion barrier plate 232B and heat sink 212 relatively further from the recording medium 250 may decrease the amount of electric field that heats the recording media from media-facing surface $232B_F$ of diffusion barrier plate 232B and $212_F$ of heat sink 212, reducing thermal background near the trailing edge of the writer pole 211 and therefore increasing the thermal gradient of the hot spot 252 along down-track direction.

As illustrated in FIG. 3C, nanorod 230 is defined by a thickness $T_{NR}$ and a length $L_{NR}$. In some example, the thickness $T_{NR}$ of nanorod 230 is between approximately 50 nm and approximately 55 nm. In one example, the length $L_{NR}$ of nanorod 230 is between approximately 75 nm and approximately 105 nm. Heat sink 234 and dielectric spacer 235 are defined by a length $L_{HS}$ (e.g., approximately 800 nm) and $L_S$ (e.g., approximately 30 nm), respectively. In the example of FIG. 3C, heat sink 234 and dielectric spacer 235 are approximately the same thickness as nanorod 230 (e.g., $T_{NR}$).

Diffusion barrier plates 232A, 232B and 232C are defined by a thickness $T_{DB-A}$, $T_{DB-B}$, and $T_{DB-C}$, respectively. In some instances, thicknesses $T_{DB-A}$, $T_{DB-B}$, and $T_{DB-C}$ may be between approximately 5 nm and approximately 20 nm. In one instance, thicknesses $T_{DB-B}$ and $T_{DB-C}$ are approximately equal. Diffusion barrier plates 232B and 232C are defined by a length $L_{DB-B}$ and $L_{DB-C}$, respectively. In some instances, the length $L_{DB-B}$ is less than length $L_{DB-C}$.

As illustrated in FIG. 3C, plasmonic plate 236 is defined by a thickness $T_{PP}$ (e.g., approximately 30 nm) and a length $L_{PP}$ (e.g., approximately 900 nm). As illustrated in FIG. 3C, in some scenarios, the length $L_{PP}$ of plasmonic plate 236 is approximately equal to the length $L_{DB-C}$ of diffusion barrier plate 232C.

FIG. 4 is a wafer plane view of slider 200 of FIG. 3A, in accordance with one or more aspects of the present disclosure. As illustrated in FIG. 4, slider 200 may include optical side shields (OSS) 260 on either crosstrack side of the NFT 208. OSS 260 includes, in some examples, Rh or Ru. In some examples, the opening $W_{oss}$ at media-facing surface 240 is between approximately 50 nm and approximately 200. OSS 260 may reduce the thermal background from the heating of excitation waveguide, which may improve the thermal gradient. In some instance, waveguide core 201 includes tapered crosstrack edges 201A, which may taper the width of core 201 from $W_{core}$ to $W_{core1}$ (e.g., $W_{core1} < W_{core}$). In some examples, is $W_{core1}$ smaller than $W_{oss}$. In the example of FIG. 4, nanorod 230 may have a constant cross-section along the z-direction.

Figure 5:
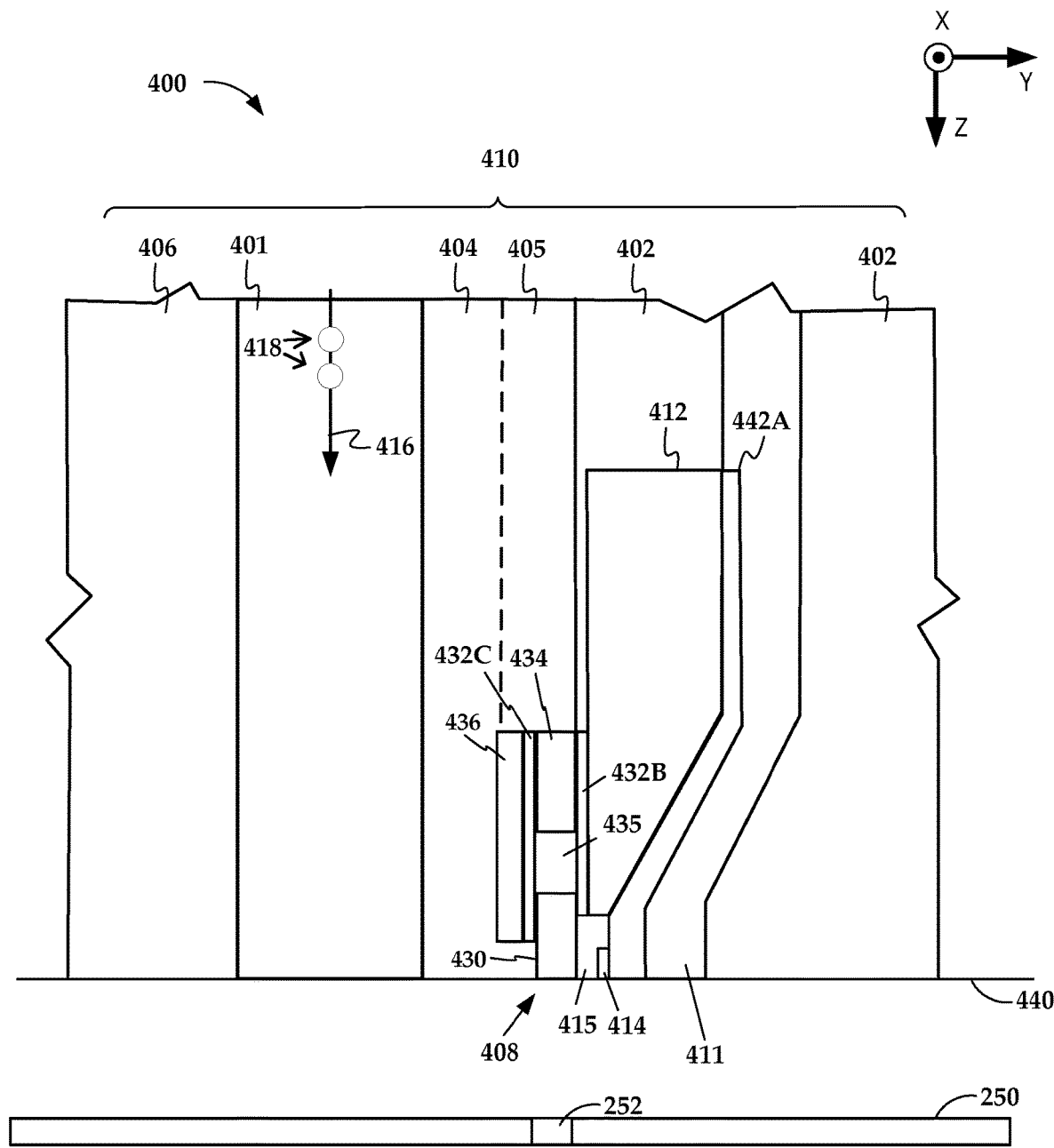
FIG. 5 is a cross-sectional view of a slider along a down-track plane, in accordance with one or more aspects of the present disclosure.

FIG. 5 is a cross-sectional view of a slider along a down-track plane, in accordance with one or more aspects of the present disclosure. Slider 400 may be an example of slider 100 of FIG. 2. Slider 400 includes NFT 408 and waveguide 410, which may be examples of NFT 108 and waveguide 110 of FIG. 2, respectively. Waveguide 410 delivers light 416 (e.g., from energy source 106 of FIG. 2) to NFT 408 at a media-facing surface 440 of slider 400. In one example, waveguide 410 is a three-dimensional dielectric waveguide that delivers light 316 with a first higher order transverse electric mode ($TE_{10}$). In the example of FIG. 5, the electric field is indicated by circles 418 (e.g., into the page).

In some examples, waveguide 410 includes core 401, top cladding layer 402, middle cladding layers 404, 405, and bottom cladding layer 406. Core 401, top cladding layer 402, middle cladding layers 404, 405, and bottom cladding layer 406 may be made of similar materials as core 201, top cladding layer 202, middle cladding layers 204, 205, and bottom cladding layer 206 of FIG. 3A, respectively, and may be arranged in a similar layout.

Slider 400 includes NFT 408 configured to heat a hotspot 252 of recording medium 250 upon excitation by electric field 418. NFT 408 includes, in some examples, nanorod 430, diffusion barrier plates 432A-432C (collectively, diffusion barrier plates 432), heat sink 434, plasmonic plate 436, dielectric spacer 415, and dielectric spacer 435. Nanorod 430, diffusion barrier plates 432, heat sink 434, and plasmonic plate 436 may be made of similar materials as nanorod 230, diffusion barrier plates 232, heat sink 234, plasmonic plate 236, dielectric spacer 215, and dielectric spacer 235 of FIG. 3A, and may be arranged in a similar layout. In some scenarios, slider 200 includes e-resonator 414, described in U.S. Pat. No. 10,121,496 entitled "Heat-assisted magnetic recording head having peg coupler and plasmonic pad," which is hereby incorporated by reference.

Slider 400 includes write pole 411 and heat sink 412. Write pole 411 and heat sink 412 may be made of similar materials as write pole 211 and heat sink 212 of FIG. 3A, respectively, and may be arranged in a similar layout.

Figure 6:
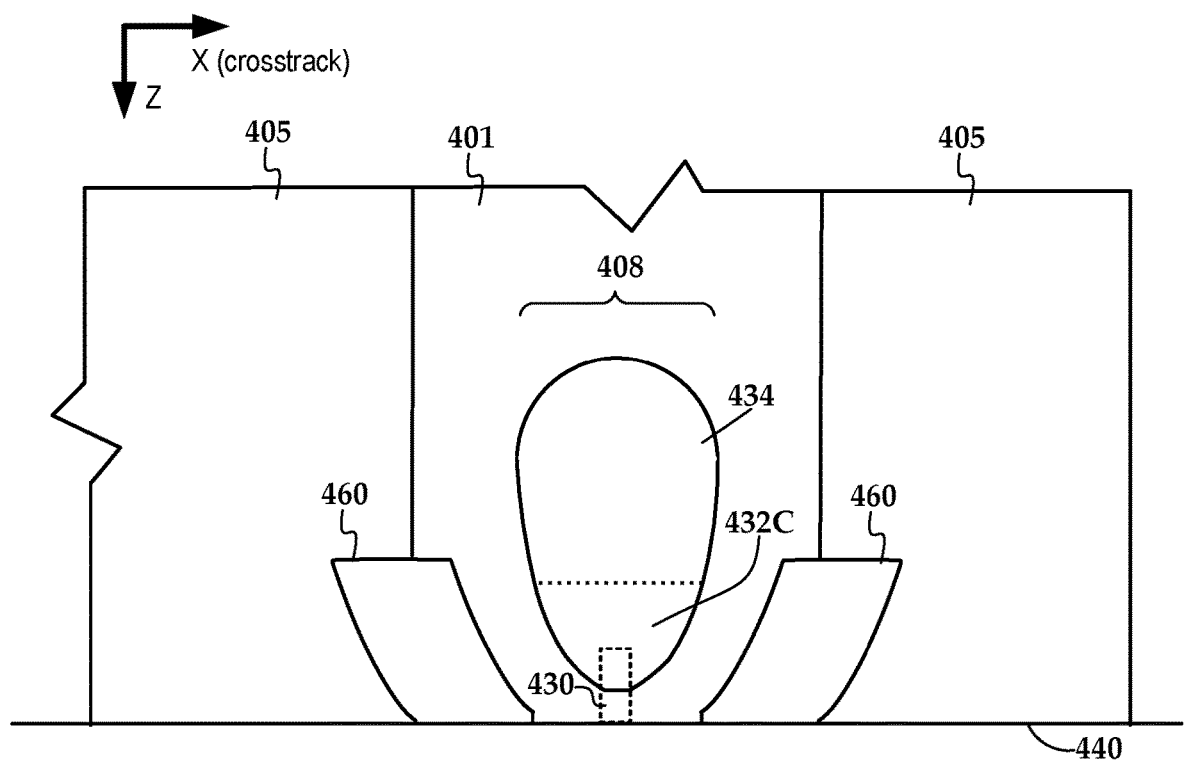
FIG. 6 is a wafer plane view of the slider of FIG. 5, in accordance with one or more aspects of the present disclosure.

FIG. 6 is a wafer plane view of slider 400 of FIG. 4, in accordance with one or more aspects of the present disclosure. As illustrated in FIG. 6, slider 400 may include sub-wavelength solid immersion mirrors 460 (also referred to as mini-SIMS 460) on either crosstrack side of the NFT 408, described in U.S. Pat. No. 9,852,753, "Waveguide light delivery with subwavelength mirror for heat-assisted magnetic recording," which is hereby incorporated by reference. Mini-SIMs 460 include, in some examples, Rh or Ru. In some examples, the opening MSO at media-facing surface 340 is approximately 200 nm or below. Mini-SIMs 460 may reduce the thermal background from the excitation waveguide, which may improve the thermal gradient. In the example of FIG. 6, nanorod 430 may have a constant cross-section along the z-direction.

Figure 7:
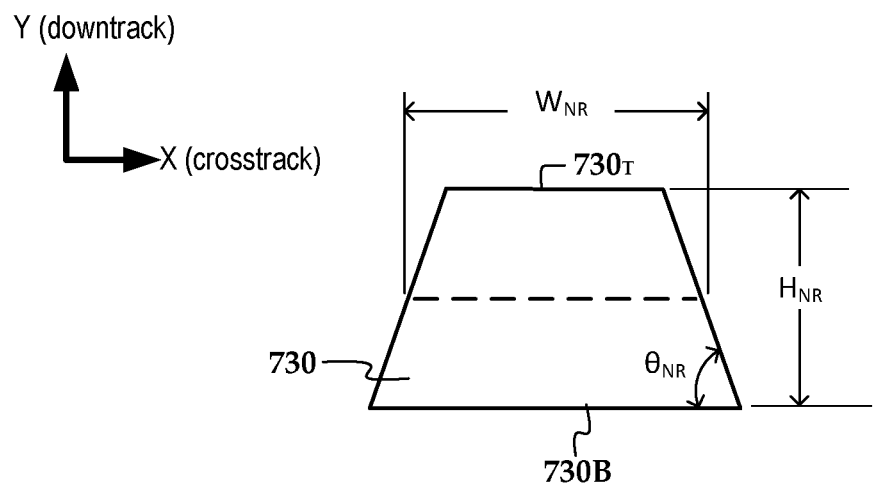
FIG. 7 is a media-facing surface view of an example nanorod, in accordance with one or more aspects of the present disclosure.

FIG. 7 is a media-facing surface view of an example nanorod, in accordance with one or more aspects of the present disclosure. Nanorod 730 may be an example of nanorod 230 of FIGS. 3A-3C and FIG. 4 or nanorod 430 of FIGS. 5-6. Nanorod 730 may have a trapezoidal cross-sectional shape on the media-facing surface. In some examples, $W_{NR}$ is approximately 41 nm, or below, determined by the desired recording track density, $H_{NR}$ is approximately 0 nm-50 nm and $\theta_{NR}$ is approximately 5°.

In the example illustrated in FIG. 7, nanorod 730 has a trapezoidal shape as projected onto the media-facing surface. Top surface 730A and bottom surface 730B correspond to top surface 230A and 230B, respectively, of nanorod 230 of FIGS. 3A-3C. In some examples, top surface 730A is narrower than bottom surface 730B. In some such examples, a transverse resonance exists, which may push the oscillating electric charges to the top surface 730A of nanorod 730 for high thermal gradient.

Various examples have been presented for the purposes of illustration and description. These and other examples are within the scope of the following claims.

What is claimed is:

1. A recording head, comprising:
a nanorod configured to generate a hotspot on a recording media, the nanorod including a top surface and a bottom surface;
a plasmonic plate configured to concentrate an electric field to excite the nanorod;
a first diffusion barrier plate configured to resist diffusion of materials between the plasmonic plate and the nanorod, the first diffusion barrier plate disposed between the nanorod and the plasmonic plate, the first diffusion barrier plate coupled to the bottom surface of the nanorod;
a first heat sink configured to dissipate heat from the nanorod;
a second diffusion barrier plate configured to resist diffusion of materials between the first heat sink and the nanorod, the second diffusion barrier plate disposed between the first heat sink and the nanorod, the second diffusion barrier plate coupled to the top surface of the nanorod; and
a second heat sink disposed between to the first diffusion barrier plate and the second diffusion barrier plate.

2. The recording head of claim 1,
wherein the first diffusion barrier plate includes a bottom surface and a top surface and the second diffusion barrier plate includes a bottom surface and a top surface,
wherein the bottom surface of the nanorod is coupled to the top surface of the first diffusion barrier plate,
wherein the top surface of the nanorod is coupled to the bottom surface of the second diffusion barrier plate.

3. The recording head of claim 1,
wherein the plasmonic plate includes a top surface that is coupled to a bottom surface of the first diffusion barrier plate, and
wherein the first heat sink includes a bottom surface that is coupled to a top surface of the second diffusion barrier plate.

4. The recording head of claim 1, further comprising a dielectric spacer disposed between the nanorod and the second heat sink.

5. The recording head of claim 4, wherein the dielectric spacer is disposed between the first diffusion barrier plate and the second diffusion barrier plate.

6. The recording head of claim 1,
wherein the recording head, plasmonic plate, and first heat sink each include a media-facing surface,
wherein the media-facing surface of the plasmonic plate is recessed from the media-facing surface of the recording head by a first distance, and
wherein the media-facing surface of the first heat sink is recessed from the media-facing surface of the recording head by a second distance that is different than the first distance.

7. The recording head of claim 6, wherein the first distance is less than the second distance.

8. The recording head of claim 1, wherein a media-facing surface of the first diffusion barrier plate and a media-facing surface of the plasmonic plate are approximately planar.

9. The recording head of claim 1, wherein a media-facing surface of the second diffusion barrier plate and a media-facing surface of the first heat sink are approximately planar.

10. The recording head of claim 1,
wherein the plasmonic plate, first diffusion barrier plate, and second diffusion barrier plate each include a rear surface, and
wherein the rear surface of the plasmonic plate, the rear surface of the first diffusion barrier plate, and the rear surface of the second diffusion barrier plate are approximately planar.

11. The recording head of claim 1, wherein a thickness of the first diffusion barrier plate is approximately equal to a thickness of the second diffusion barrier plate.

12. The recording head of claim 1, wherein the first diffusion barrier plate and second diffusion barrier plate are formed of at least one of Rh, Ir, Pt, Pd, metal nitrides, or grapheme.

13. The recording head of claim 1, wherein the plasmonic plate and the nanorod are each formed of at least one of Au, a Au-alloy, Ag, or Cu.

14. A recording head comprising:
a nanorod configured to generate a hotspot on a recording media, the nanorod including a top surface and a bottom surface;

a heat sink configured to dissipate heat from the nanorod;
a first diffusion barrier plate configured to resist diffusion of materials between the heat sink and the nanorod, the first diffusion barrier plate disposed between the heat sink and the nanorod, the first diffusion barrier plate coupled to the top surface of the nanorod;
a write pole; and
a second diffusion barrier plate configured to resist diffusion of materials between the write pole and the nanorod, the second diffusion barrier plate disposed between the write pole and the heat sink.

15. The recording head of claim 14,
wherein the heat sink and the second diffusion barrier plate each include a rear surface, and
wherein the rear surface of the heat sink and the rear surface of the second diffusion barrier plate are approximately planar.

16. The recording head of claim 14, further comprising a dielectric spacer disposed between the nanorod and the second diffusion barrier plate.

17. The recording head of claim 14, further comprising:
a waveguide core configured to transmit light;
wherein the nanorod is disposed between the waveguide core and the write pole.

18. The recording head of claim 17, further comprising:
a plasmonic plate configured to concentrate an electric field to excite the nanorod; and
a cladding layer disposed between the waveguide core and the plasmonic plate and disposed between the waveguide core and the nanorod.

19. A data storage device comprising:
a recording head comprising:
a nanorod configured to heat a hotspot on a recording media, the nanorod including a top surface and a bottom surface;
a plasmonic plate configured to concentrate an electric field to excite the nanorod;
a first diffusion barrier plate configured to resist diffusion of materials between the plasmonic plate and the nanorod, the first diffusion barrier plate disposed between the nanorod and the plasmonic plate, the first diffusion barrier plate coupled to the bottom surface of the nanorod;
a first heat sink configured to dissipate heat from the nanorod;
a second diffusion barrier plate configured to resist diffusion of materials between the first heat sink and the nanorod, the second diffusion barrier plate disposed between the first heat sink and the nanorod, the second diffusion barrier plate coupled to the top surface of the nanorod; and
a second heat sink disposed between to the first diffusion barrier plate and the second diffusion barrier plate.

* * * * *